(12) United States Patent
Sherman

(10) Patent No.: US 8,260,348 B2
(45) Date of Patent: Sep. 4, 2012

(54) WIRELESS COMMUNICATOR FOR LAPTOP COMPUTERS

(75) Inventor: Itay Sherman, Hod Hasharon (IL)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 12/151,079

(22) Filed: May 3, 2008

(65) Prior Publication Data
US 2009/0239470 A1 Sep. 24, 2009

Related U.S. Application Data

(60) Provisional application No. 61/069,987, filed on Mar. 19, 2008.

(51) Int. Cl.
*H04B 7/00* (2006.01)
*H04M 1/00* (2006.01)

(52) U.S. Cl. .................................. 455/556.1; 455/41.2

(58) Field of Classification Search .............. 455/41.2, 455/556.1, 553.1
See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 5,983,073 A | 11/1999 | Ditzik |
| 6,188,917 B1 | 2/2001 | Laureanti |
| 6,201,867 B1 | 3/2001 | Koike |
| 6,243,578 B1 | 6/2001 | Koike |
| 6,477,357 B1 | 11/2002 | Cook |
| 6,516,202 B1 | 2/2003 | Hawkins et al. |
| 6,640,113 B1 | 10/2003 | Shim et al. |
| 6,690,947 B1 | 2/2004 | Tom |

(Continued)

FOREIGN PATENT DOCUMENTS

EP 1871075 A1 12/2007
(Continued)

OTHER PUBLICATIONS

Kineto Wireles, Inc., The Dual-Mode Handset Opportunity, How the 3GPP UMA standard enables mobile operators to embrace the cost and performance advantages of broadband, VoIP and Wi-Fi access technologies, Jan. 2007, A Kineto White Paper; http://www.kineto.com/products/downloads/kineto_wp_UMA_DMH_2007.pdf.

*Primary Examiner* — Temesgh Ghebretinsae
*Assistant Examiner* — Gennadiy Tsvey
(74) *Attorney, Agent, or Firm* — Soquel Group LLC

(57) ABSTRACT

A communication system including a wireless communicator including a baseband modem for connecting to the Internet via a cellular network, and a connector for physically connecting the wireless communicator to a laptop computer port, and a laptop computer including a wireless modem for communicating in a wireless mode with the wireless communicator, a port for physically connecting the wireless communicator to the laptop computer and for communicating in a wired mode with the wireless communicator, and a connection wedge, wherein the laptop computer connects to the Internet via a link between the laptop computer and the wireless communicator, and wherein the connection wedge selectively uses the wired mode or the wireless mode for the link according to whether or not the wireless communicator is physically connected to the laptop computer, respectively. A method is also described and claimed.

13 Claims, 9 Drawing Sheets

U.S. PATENT DOCUMENTS

| | | |
|---|---|---|
| 6,751,474 B1 | 6/2004 | Lin et al. |
| 6,898,283 B2 | 5/2005 | Wycherley et al. |
| 6,907,264 B1 | 6/2005 | Sterkel |
| 6,968,394 B1 * | 11/2005 | El-Rafie .................. 455/3.01 |
| 6,999,792 B2 | 2/2006 | Warren |
| 7,085,542 B2 | 8/2006 | Dietrich et al. |
| 7,194,285 B2 | 3/2007 | Tom |
| 7,242,963 B1 * | 7/2007 | Karstens et al. ............. 455/557 |
| 7,266,391 B2 | 9/2007 | Warren |
| 2002/0090980 A1 | 7/2002 | Wilcox et al. |
| 2002/0151327 A1 | 10/2002 | Levitt |
| 2004/0233930 A1 | 11/2004 | Colby, Jr. |
| 2004/0268005 A1 | 12/2004 | Dickie |
| 2005/0070225 A1 | 3/2005 | Lee |
| 2005/0159184 A1 | 7/2005 | Kerner et al. |
| 2005/0233749 A1 | 10/2005 | Karaoguz et al. |
| 2006/0003804 A1 | 1/2006 | Liu |
| 2006/0056446 A1 * | 3/2006 | Lee et al. .................. 370/465 |
| 2006/0105722 A1 | 5/2006 | Kumar |
| 2006/0116113 A1 | 6/2006 | Gass |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0167167 A1 | 7/2007 | Jiang |
| 2007/0175994 A1 | 8/2007 | Fruhauf |
| 2007/0288583 A1 | 12/2007 | Rensin et al. |
| 2008/0009325 A1 | 1/2008 | Zinn et al. |
| 2008/0026794 A1 | 1/2008 | Warren |
| 2008/0031201 A1 | 2/2008 | Lee |
| 2008/0040354 A1 | 2/2008 | Ray et al. |
| 2008/0070501 A1 * | 3/2008 | Wyld ..................... 455/41.2 |
| 2008/0140886 A1 | 6/2008 | Izutsu |
| 2009/0147758 A1 | 6/2009 | Kumar |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

WIRELESS COMMUNICATOR FOR LAPTOP COMPUTERS

PRIORITY REFERENCE TO RELATED APPLICATIONS

This application claims benefit of U.S. Provisional Application No. 61/069,987, entitled MODULAR CELL PHONE FOR LAPTOP COMPUTERS, filed on Mar. 19, 2008 by inventor Itay Sherman.

FIELD OF THE INVENTION

The field of the present invention is cellular communication.

BACKGROUND OF THE INVENTION

Conventional laptop computers generally connect to the Internet using an internal or an external modem, such as a dial-up or a cellular modem. The connection between a laptop computer and an external modem may be via network cable, USB, PCMCIA or wireless.

Despite ubiquitous connectivity available today, situations still abound where a laptop computer does not have Internet connectivity, or where a laptop computer loses Internet connectivity during an ongoing Internet session. In such situations, a user may use his cell phone as a link to connect his laptop computer to the Internet via a cellular communication network. However, using standard connection protocols, such as Dynamic Host Configuration Protocol (DHCP), if a laptop computer's Internet connection is changed during an ongoing Internet session from linking to the Internet via a physical (wired) modem to linking via a wireless modem connection, or vice versa, a new IP address must be allocated. Allocating a new IP address disrupts the ongoing Internet connection session.

It would thus be of advantage if a user could use his cell phone to connect his laptop computer to the Internet in such a way that the same IP address persists when his Internet connection is handed over from a physical link to a wireless link, or vice versa, during an ongoing Internet connection session.

SUMMARY OF THE DESCRIPTION

Aspects of the present invention relate to a wireless communicator that connects with a laptop computer by a physical USB connection and by a short range wireless Bluetooth connection, and to methods and systems that maintain the same IP address when switching from the USB over to the Bluetooth connection, and vice versa, during an ongoing Internet session. The laptop computer uses the wireless communicator as a link to connect to the Internet. When the wireless communicator is physically attached to the laptop computer, the laptop computer may use either the USB connection or the Bluetooth connection, or both connections, to transfer data to and from the wireless communicator. When the wireless communicator is not physically attached to the laptop computer, the laptop computer uses the Bluetooth connection to transfer data to and from the wireless communicator.

Embodiments of the present invention provide a unified driver, referred to herein as a connection wedge, that selectively uses one or both of the USB and Bluetooth connections, according to whether or not the wireless communicator is physically attached to the laptop computer. In one embodiment the connection wedge is implemented as a software driver wedged between Bluetooth and USB low level communication drivers and the laptop computer's networking stack.

In addition to providing a link to the Internet via the wireless communicator, the connection wedge is also advantageous in automatic Bluetooth pairing of the wireless communicator with the laptop computer. The connection wedge is further advantageous in instructing the Bluetooth connection to operate in a low power mode when the USB connection is active.

More generally, embodiments of the present invention relate to a laptop computer that uses a cell phone for Internet connections, and that has both a physical connection and a wireless connection to the cell phone. The physical connection is active when the cell phone is attached to the laptop computer. The wireless connection is active when the cell phone is in proximity of the laptop computer, whether or not the cell phone is physically attached thereto. Internet connections of the laptop computer are persisted during a connection session before, during and after attachment of the cell phone to the laptop computer and detachment of the cell phone from the laptop computer, without reallocation of IP address.

There is thus provided in accordance with an embodiment of the present invention a communication system including a wireless communicator including a baseband modem for connecting to the Internet via a cellular network, and a connector for physically connecting the wireless communicator to a laptop computer port, and a laptop computer including a wireless modem for communicating in a wireless mode with the wireless communicator, a port for physically connecting the wireless communicator to the laptop computer and for communicating in a wired mode with the wireless communicator, and a connection wedge, wherein the laptop computer connects to the Internet via a link between the laptop computer and the wireless communicator, and wherein the connection wedge selectively uses the wired mode or the wireless mode for the link according to whether or not the wireless communicator is physically connected to the laptop computer port, respectively.

There is additionally provided in accordance with an embodiment of the present invention a method of communication, including opening a data connection from a laptop computer to the Internet via a wireless communicator, wherein the wireless communicator connects to the Internet over a cellular network and wherein the laptop computer connects to the wireless communicator over a short range wireless link, a physical link, or both a short range wireless link and a physical link, selectively using at least one appropriate link between the laptop computer and the wireless communicator according to whether or not the wireless communicator is physically attached to the laptop computer, and maintaining integrity of the data transmitted over the data connection before, during and after the selectively using.

There is further provided in accordance with an embodiment of the present invention a laptop computer including a wireless modem for communicating in a wireless mode with a wireless communicator, a port for physically connecting the wireless communicator to the laptop computer and for communicating in a wired mode with the wireless communicator, and a connection wedge, wherein the laptop computer connects to the Internet via a link between the laptop computer and the wireless communicator, and wherein the connection wedge selectively uses the wired mode or the wireless mode for the link according to whether or not the wireless communicator is physically connected to the laptop computer port, respectively.

There is further provided in accordance with an embodiment of the present invention a communication system including a wireless communicator including a baseband modem for conducting a phone call via a cellular network, a microphone for providing audio input during the phone call, a speaker for providing audio output during the phone call, a connector for physically connecting the wireless communicator to a laptop computer port, and a laptop computer including a microphone for providing audio input, at least one speaker for providing audio output, a port for physically connecting the wireless communicator to the laptop computer, and an audio bridge, for using the laptop computer microphone instead of the wireless communicator microphone to provide audio input during the phone call, and for using the laptop computer at least one speaker instead of the wireless communicator speaker to provide audio output during the phone call, when the wireless communicator is physically connected to the laptop computer port.

There is moreover provided in accordance with an embodiment of the present invention a method of communication, including detecting, by a laptop computer, that a wireless communicator has been physically attached to the laptop computer during an ongoing phone call being conducted via the wireless communicator, channeling audio input from the laptop computer microphone to the wireless communicator when the detecting occurs, and channeling audio output from the wireless communicator to one or more speakers of the laptop computer when the detecting occurs.

There is additionally provided in accordance with an embodiment of the present invention a laptop computer including a microphone for providing audio input, at least one speaker for providing audio output, a port for physically connecting a wireless communicator to the laptop computer, and an audio bridge, for using the laptop computer microphone to provide audio input during an ongoing phone call being conducted via the wireless communicator, and for using the laptop computer at least one speaker to provide audio output during the ongoing phone call, when the wireless communicator is physically connected to the laptop computer port during the ongoing phone call.

BRIEF DESCRIPTION OF THE DRAWINGS

The present invention will be more fully understood and appreciated from the following detailed description, taken in conjunction with the drawings in which.

DETAILED DESCRIPTION

Figure 1:
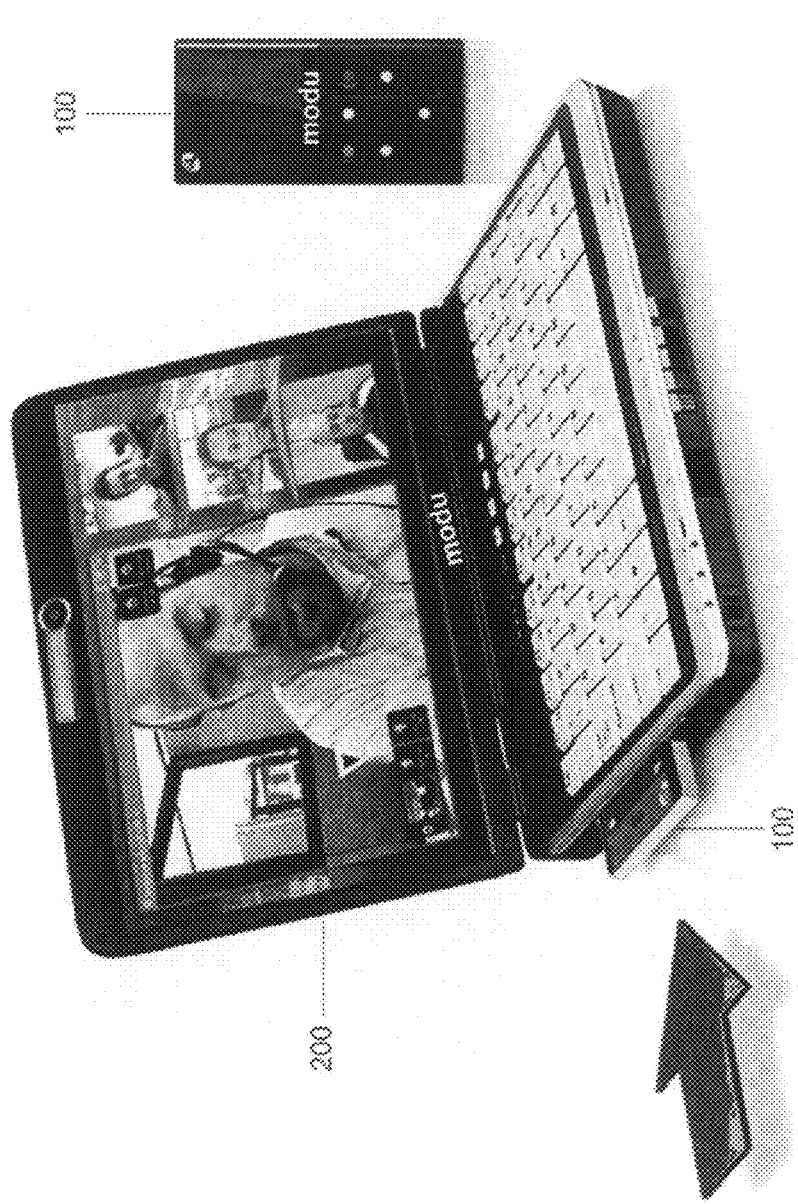
FIG. 1 is an illustration of a wireless communicator that attaches to a laptop computer, in accordance with an embodiment of the present invention.

Aspects of the present invention relate to a wireless communicator that interoperates with a laptop computer. In this regard, reference is now made to FIG. 1, which is an illustration of a wireless communicator 100 that connects to a laptop computer 200, in accordance with an embodiment of the present invention. As shown in FIG. 1, wireless communicator 100 may be physically attached to laptop computer 200, or not physically attached but in proximity of short range wireless communication. Whether wireless communicator 100 and laptop computer 200 are connected physically or wirelessly, wireless communicator 100 enhances the capabilities of laptop computer 200, and laptop computer 200 enhances the capabilities of wireless communicator 100, as described hereinbelow.

Figure 2:
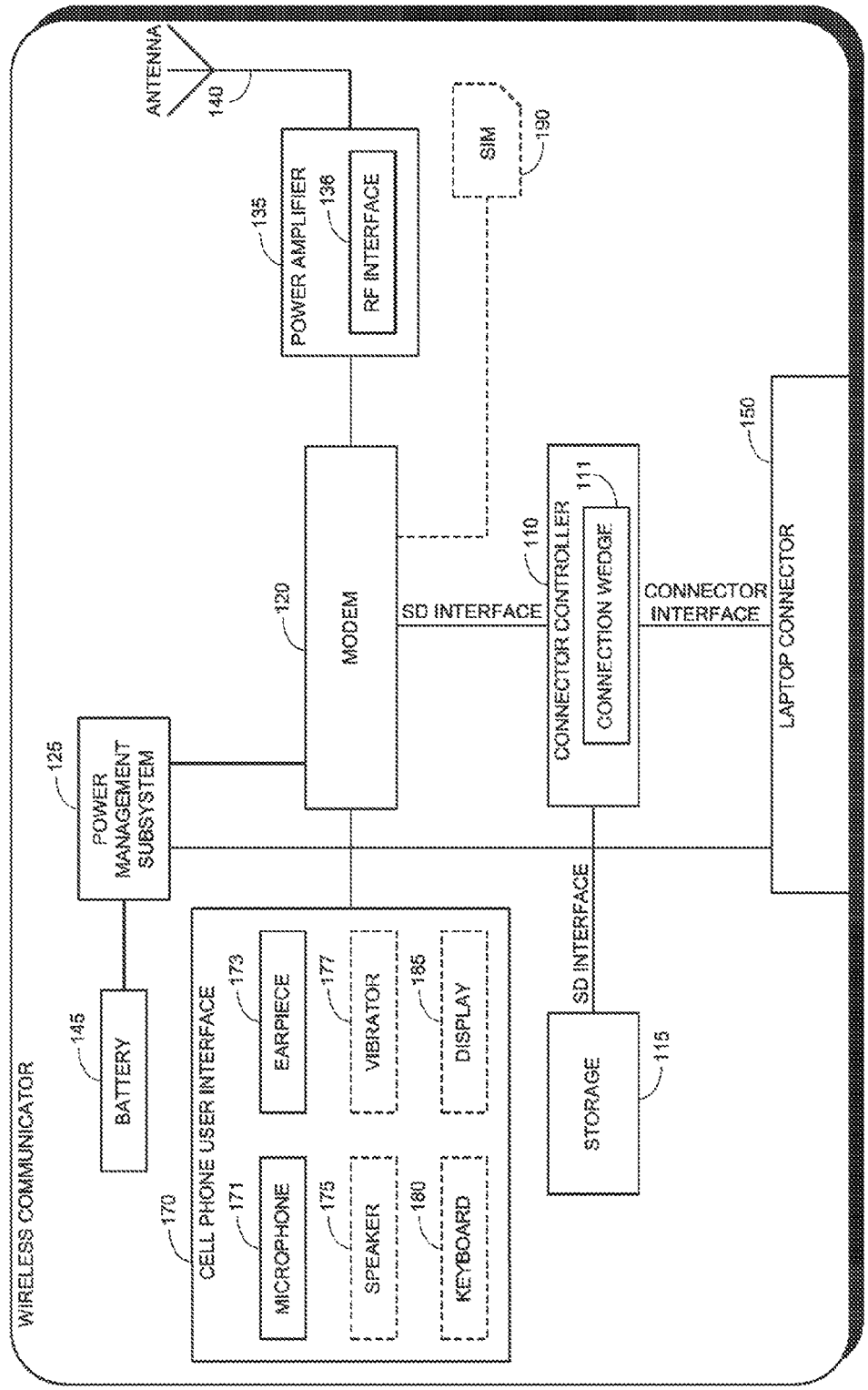
FIG. 2 is a simplified block diagram of the wireless communicator of FIG. 1, in accordance with an embodiment of the present invention.

Reference is now made to FIG. 2, which is a simplified block diagram of wireless communicator 100, in accordance with an embodiment of the present invention. Wireless communicator 100 includes six primary components, as follows: a connector controller 110, a memory storage 115, a base band modem 120 for sending and receiving voice and data communications, a power management subsystem 125, a power amplifier 135 and a user interface 170.

Connector controller 110 executes programmed instructions that control the data flow between wireless communicator 100 and laptop computer 200. Modem 120 controls the wireless communication functionality of wireless communicator 100. In addition to enabling cellular communication, modem 120 also enables wireless communicator 100 with short range wireless communication, including inter alia one or more of Dedicated Short Range Communication (DSRC), Bluetooth, WiFi, ZigBee, Radio Frequency Identification (RFID) and Near Field Communication (NFC).

Power management subsystem 125 includes charging circuitry for charging a battery 145. Power amplifier 135 includes a radio frequency (RF) interface 136, and is connected to an internal antenna 140. User interface 170 includes a microphone 171 and an earpiece 173. User interface 170 also includes an optional speaker 175, an optional vibrator 177, an optional keyboard 180 and an optional display 185. It will be appreciated by those skilled in the art that user interface 170 may include additional components.

Wireless communicator 100 includes a laptop connector 150 for physically connecting wireless communicator 100 to laptop computer 200. Laptop connector 150 may be inter alia a USB connector, or a proprietary connector that includes USB signal lines. Wireless communicator 100 optionally includes a subscriber identification module (SIM) 190.

In accordance with an embodiment of the present invention, the interface between connector controller 110 and storage 115, and the interface between connector controller 110 and modem 120 are SD interfaces. The interface between connector controller 110 and laptop connector 150 is a special purpose connector interface.

In accordance with an embodiment of the present invention connector controller 110 includes a connection wedge 111 for selecting a physical mode of connection or a wireless mode of connection between wireless communicator 100 and laptop computer 200, according to whether or not wireless communicator 100 is physically connected to laptop computer 200 via connector 150, respectively.

Figure 3:
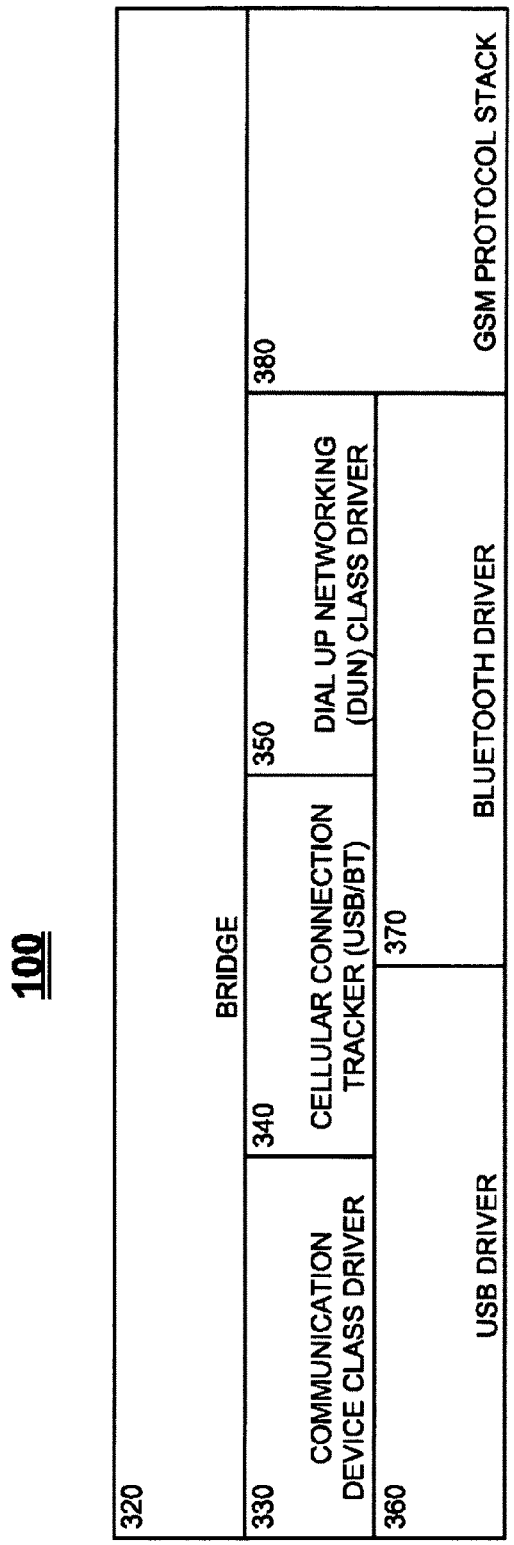
FIG. 3 is a simplified diagram of a stack of communication drivers for the wireless communicator of FIG. 1, in accordance with an embodiment of the present invention.

In this regard, reference is made to FIG. 3, which is a simplified diagram of a stack of communication drivers for wireless communicator 100, in accordance with an embodiment of the present invention. As shown in FIG. 3, wireless communicator 100 includes drivers 360 and 370 for low level physical and wireless communication protocols, such as USB and Bluetooth, respectively.

Connection wedge 111 is implemented as a bridge driver 320. Bridge driver 320 operates above a communication device class driver 330, a dial up networking class driver 350, and a GSM protocol stack 380, which in turn operate above the communicator's USB and Bluetooth drivers 360 and 370, respectively.

In accordance with an embodiment of the present invention, a cellular connection tracker 340 notifies connection wedge 111 of a connection state from the physical and wireless low level communication drivers 360 and 370, respectively. The connection state represents whether the physical and wireless connections are active or inactive. Each driver 360 and 370 detects whether or not there is a corresponding connection. Connection tracker 340 tracks and reports to connection wedge 111 which connections are available at a given moment. Based on the connection state, connection wedge 111 routes packets coming into and going out from the wireless communicator's networking stack to the appropriate one of the physical and wireless low level communication drivers 360 and 370, respectively. In accordance with an embodiment of the present invention, bridge driver 320 and/or connection tracker 340 includes logic for prioritizing which connection to use.

In one embodiment of the present invention, connection wedge 111 provides priority to the physical connection. As such, if both connections are active, when wireless communicator 100 is attached to laptop computer 200, connection wedge 111 uses the physical connection for data transmission. Data received at either the physical or the wireless communication is routed to the networking stack.

In another embodiment of the present invention, connection wedge 111 enables both physical and wireless communication to operate when the physical and wireless connections are both active.

Figure 4:
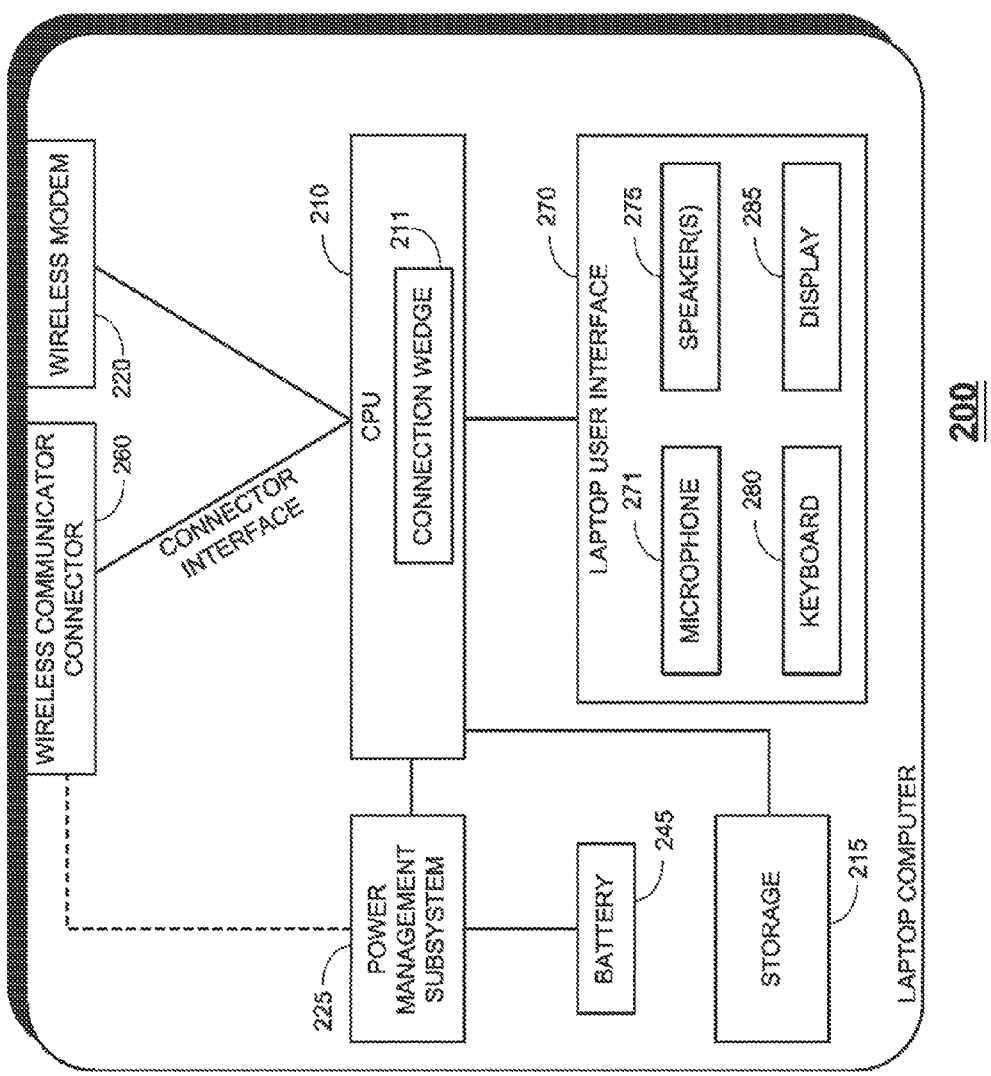
FIG. 4 is a simplified block diagram of the laptop computer of FIG. 1, in accordance with an embodiment of the present invention.

Reference is now made to FIG. 4, which is a simplified block diagram of laptop computer 200, in accordance with an embodiment of the present invention. Laptop computer 200 includes five primary components, as follows: a laptop controller 210, a memory storage 215, a wireless modem 220, a power management system 225 and a battery 245. Laptop computer 200 includes a wireless communicator connector 260 for physically connecting wireless communicator 100 to laptop computer 200.

Laptop computer 200 includes a user interface 270 including a microphone 271, mono or stereo speakers 275, a keyboard 280 and a display 285. It will be appreciated by those skilled in the art that user interface 270 may include additional components.

In accordance with an embodiment of the present invention laptop controller 210 includes a connection wedge 211 for selecting a physical mode of connection or a wireless mode of connection between laptop computer 200 and wireless communicator 100, according to whether or not wireless communicator 100 is physically connected to laptop computer 200 via connector 260, respectively. Specifically, laptop computer 200 includes drivers for low level physical and wireless communication protocols, such as USB and Bluetooth, respectively, which serve as bridges to the laptop computer's networking stack. The specific low level communication protocols implemented in laptop computer 200 are transparent to the laptop computer's networking stack.

Figure 5:
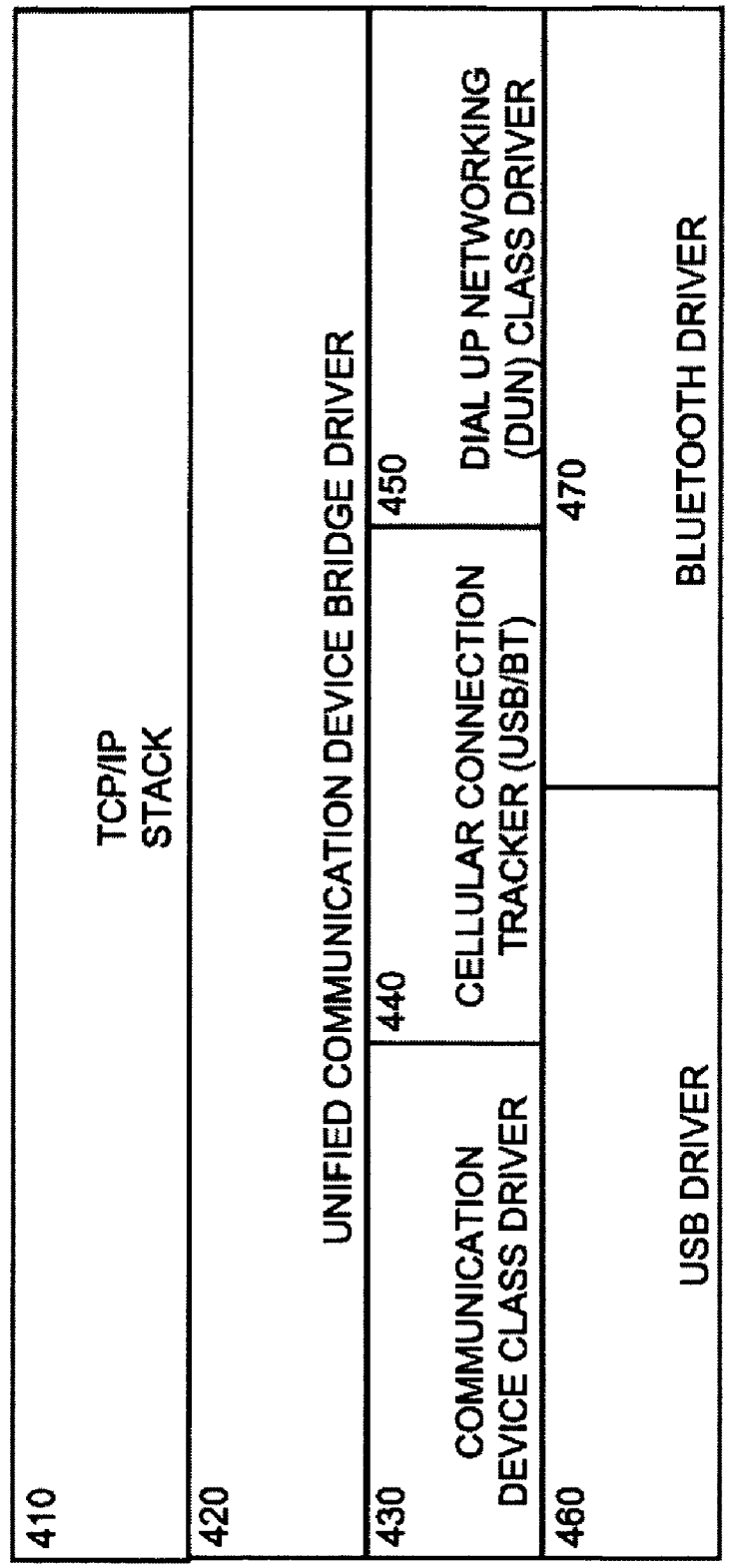
FIG. 5 is a simplified diagram of a stack of communication drivers for the laptop computer of FIG. 1, in accordance with an embodiment of the present invention.

In this regard reference is made to FIG. 5, which is a simplified diagram of a stack of communication drivers for laptop computer 200, in accordance with an embodiment of the present invention. Connection wedge 211 is implemented as a unified communication device bridge driver 420 that is wedged between the laptop computer's physical and wireless drivers 460 and 470, respectively, and the laptop computer's networking stack 410. Unified bridge driver 420 operates above a communication device class driver 430 and a dial up networking class driver 450, which in turn operate above the laptop computer's USB and Bluetooth drivers 460 and 470, respectively.

In accordance with an embodiment of the present invention, a cellular connection tracker 440 notifies connection wedge 211 of a connection state from the physical and wireless low level communication drivers 460 and 470, respectively. The connection state represents whether the physical and wireless connections are active or inactive. Each driver 460 and 470 detects whether or not there is a corresponding connection. Connection tracker 440 tracks and reports to connection wedge 211 which connections are available at a given moment. Based on the connection state, connection wedge 211 routes packets coming into and going out from the laptop computer's networking stack to the appropriate one of the physical and wireless low level communication drivers 460 and 470, respectively. In accordance with an embodiment of the present invention, unified bridge driver 420 and/or connection tracker 440 includes logic for prioritizing which connection to use.

In one embodiment of the present invention, connection wedge 211 provides priority to the physical connection. As such, if both connections are active, when wireless communicator 100 is attached to laptop computer 200, connection wedge 211 uses the physical connection for data transmission. Data received at either the physical or the wireless communication is routed to the networking stack.

In another embodiment of the present invention, connection wedge 211 enables both physical and wireless communication to operate when the physical and wireless connections are both active.

In yet another embodiment of the present invention, connection wedge 211 instructs the wireless connection to transfer to a low power state, such as Sniff or Park, in order to minimize power consumption. If the physical connection becomes unavailable, then connection wedge 211 resumes regular operation of the wireless connection.

Connection wedge 211 is advantageous in reducing latency and complexity of the Bluetooth pairing process. By using the physical connection, connection wedge 211 communicates with wireless communicator 100 and provides wireless communicator 100 with the necessary information for pairing with the laptop computer's wireless transceiver.

Such information may include inter alia a PIN code and timing data, thereby simplifying the manual intervention required for pairing.

The following logic is an exemplary connection prioritization logic, based on the discussion hereinabove.

TABLE I

Exemplary USB/Bluetooth connection priority logic

| Connection State | Prioritization |
|---|---|
| One connection available | Use available connection |
| Both connections available | Use USB connection and transfer Bluetooth connection to park/sniff |
| Bluetooth connection is available and USB connection becomes available | Wait approximately 30 seconds before transferring to the USB connection |
| USB connection is available and Bluetooth connection becomes available | Use USB connection and perform Bluetooth pairing to prepare Bluetooth connection |

Connection wedge 211 may be preinstalled on laptop computer 200, or may be stored on wireless communicator 100 and then automatically installed on laptop computer 200 when wireless communicator 100 is attached thereto. Wireless communicator 100 connects as a USB mass storage device to laptop computer 200, with AutoRun capability for automatic installation of connection wedge 211.

Each of wireless communicator 100 and laptop computer 200 is able to operate independently of the other. Wireless communicator 100 operates as a cell phone, and laptop computer 200 operates as a computer with an Internet connection. In this regard, reference is now made to FIG. 6, which is a simplified block diagram of wireless communicator 100 and laptop computer 200 operating independently of one another, whereby wireless communicator 100 uses a cellular network 500 and laptop computer 200 uses an Internet connection, in accordance with an embodiment of the present invention.

Cellular network 500 includes a base transceiver station (BTS) 510, which terminates an over-the-air interface over which subscriber traffic is communicated to and from wireless communicator 100. Cellular network 500 also includes a base station controller (BSC) 520, which is a switching module that provides handoff functions and power level control in base transceiver stations.

BSC 520 controls the interface between a serving GPRS support note (SGSN) 530 and BTS 510. SGSN 530 services cellular communicator 100 by sending or receiving packets via BSC 520. SGSN 530 is responsible for delivery of data packets to and from wireless communicator 100, within a service area. SGSN 530 also performs packet routing and transfer, mobility management, local link management, authentication and charging functions.

Cellular network 500 also includes a gateway GPRS support note (GGSN) 540, which serves as a gateway to Internet 550.

Figure 6:
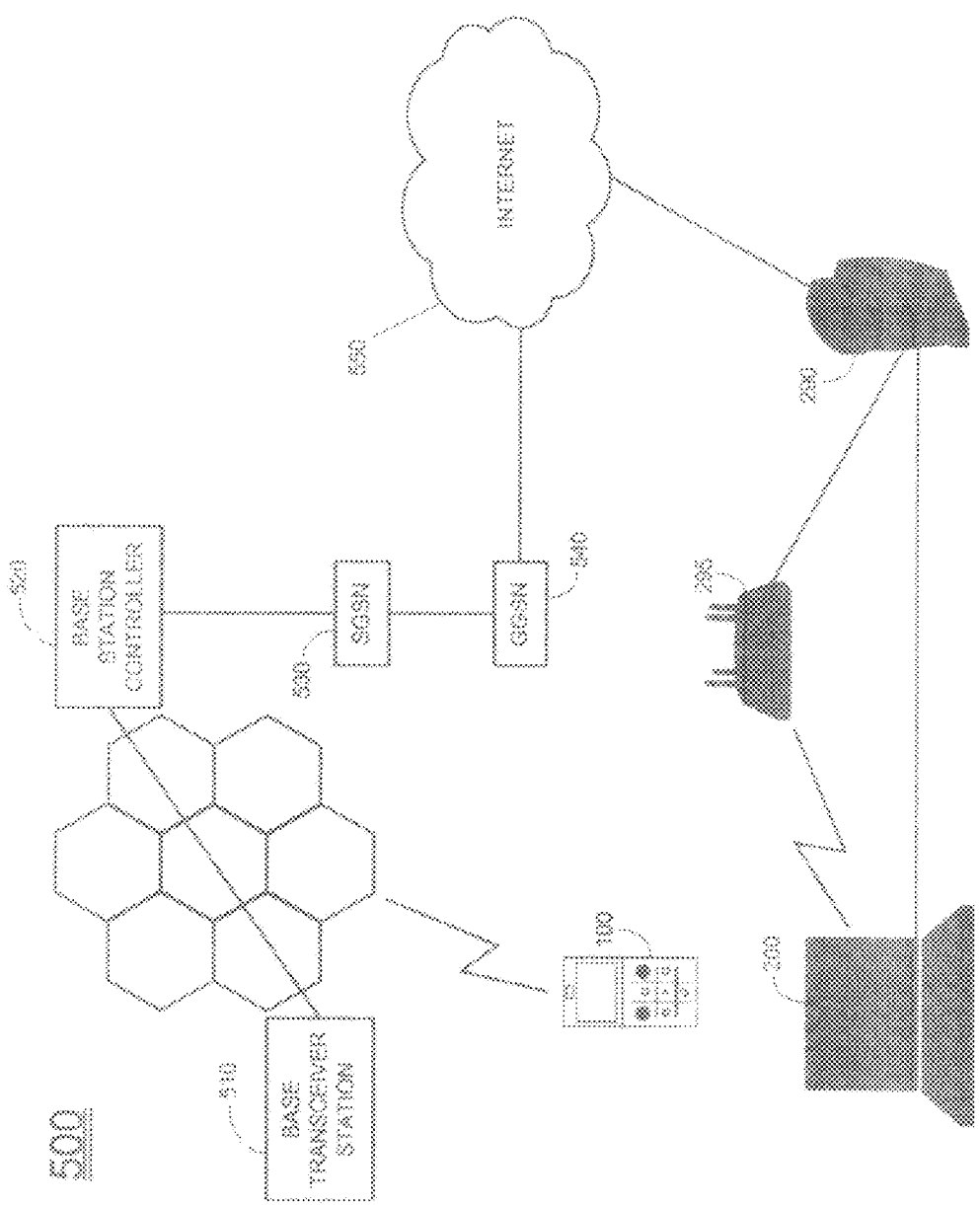
FIG. 6 is a simplified block diagram of the wireless communicator and the laptop computer of FIG. 1 operating independently of one another, whereby the wireless communicator uses a cellular network and the laptop computer uses an Internet connection, in accordance with an embodiment of the present invention.

As shown in FIG. 6, wireless communicator 100 connects to Internet 550 via cellular network 500. Laptop computer 200 connects to the Internet either (i) via a modem 290, or (ii) via a router 295 and modem 290. In the former case, laptop computer 200 is physically connected to modem 290 via an Ethernet cable. In the latter case, laptop computer 200 is connected to router 295 via a wireless connection, such as a WiFi connection, and router 295 is physically connected to modem 290.

Figure 7:
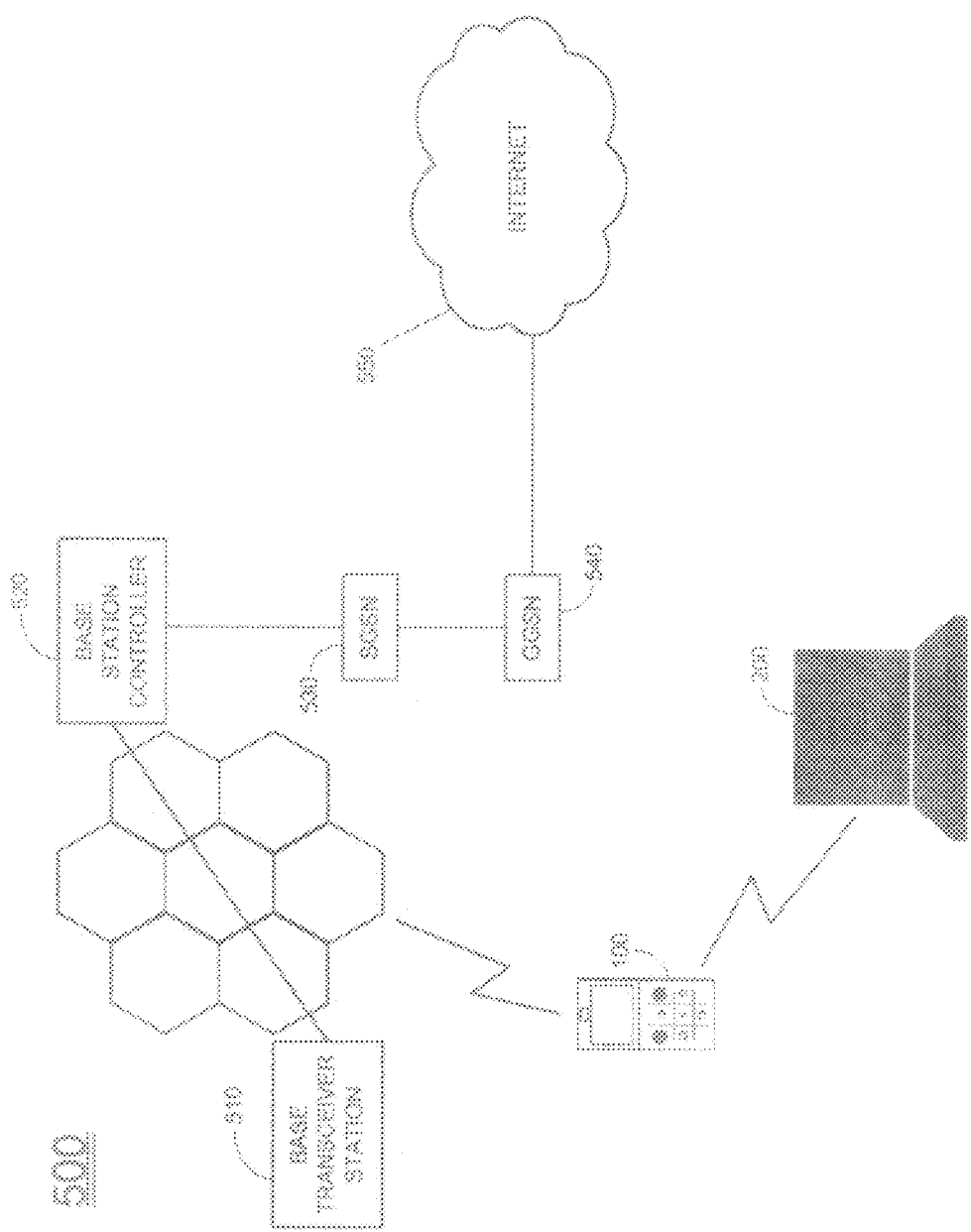
FIG. 7 is a simplified block diagram of the wireless communicator and the laptop computer of FIG. 1 operating jointly within the cellular network when the wireless communicator is not physically attached to the laptop computer, in accordance with an embodiment of the present invention.
Figure 8:
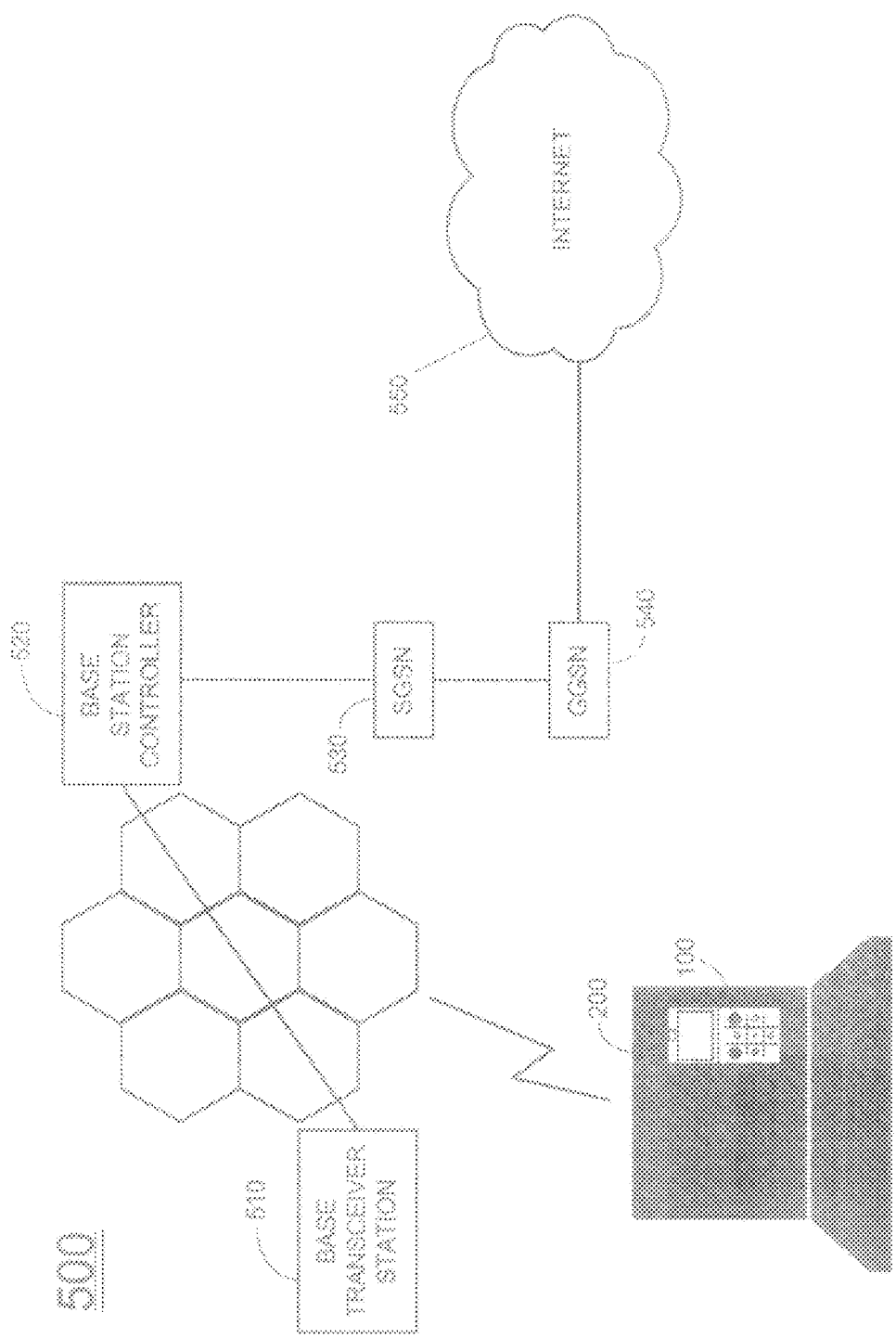
FIG. 8 is a simplified block diagram of the wireless communicator and the laptop computer of FIG. 1 operating jointly within the cellular network when the wireless communicator is physically attached to the laptop computer, in accordance with an embodiment of the present invention.

Although cellular network 500 as shown in FIGS. 6-8 is a General Packet Radio Service (GPRS) network it will be appreciated by those skilled in the art that the present invention may be employed with other wireless networks, including inter alia Code Division Multiple Access (CDMA) networks and IEEE 802.11b WiFi networks.

Although laptop computer 200 can operate independently of wireless communicator 100, when laptop computer 200 does not have its own connectivity it can use wireless communicator 100 to provide connectivity. In this regard, reference is now made to FIG. 7, which is a simplified block diagram of wireless communicator 100 and laptop computer 200 operating jointly within cellular network 500 when wireless communicator 100 is not physically attached to laptop computer 200, in accordance with an embodiment of the present invention. When wireless communicator 100 is not attached to laptop computer 200, the two devices communicate using a short range wireless connection. As such, laptop computer 200 connects to Internet 550 via a combination of its short range wireless connection with wireless communicator 100, and the cellular connection between wireless communicator 100 and Internet 550.

Reference is now made to FIG. 8, which is a simplified block diagram of wireless communicator 100 and laptop computer 200 operating jointly within cellular network 500 when wireless communicator 100 is physically attached to laptop computer 200, in accordance with an embodiment of the present invention. When wireless communicator 100 is attached to laptop computer 200, the two devices communicate using a physical connection. As such, laptop computer 200 connects to Internet 550 via a combination of its physical connection with wireless communicator 100, and the cellular connection between wireless communicator 100 and Internet 550.

In accordance with an embodiment of the present invention, when laptop computer 200 connects to Internet 550 with wireless communicator 100 attached thereto, the connection between laptop computer 200 and Internet 550 switches seamlessly, without reallocation of IP address, from the physical connection mode of FIG. 8 to the wireless mode of FIG. 7 when wireless communicator 100 is detached from laptop computer 200. Similarly, when wireless communicator 100 is detached from laptop computer 200, the Internet connection switches seamlessly, without reallocation of IP address, between the wireless mode of FIG. 7 to the physical connection mode of FIG. 8 when wireless communicator 100 is re-attached to laptop computer 200. In this regard, reference is now made to FIG. 9, which is a simplified flowchart of switching the connection between laptop computer 200 and Internet 550, according to whether wireless communicator 100 is physically or wirelessly connected with laptop computer 200, in accordance with an embodiment of the present invention.

At step 910 wireless communicator 100 is attached to laptop computer 200, by attaching connectors 160 and 260. Data is transferred between the two devices using a physical connection, as indicated in FIG. 8.

At step 920 connection wedge 211 uses the physical communication mode of FIG. 8. Laptop computer 200 thus connects to Internet 550 using an Internet connection that goes physically from laptop computer 200 to wireless communicator 100, and wirelessly from wireless communicator 100 to Internet 550.

At step 930 wireless communicator 100 is detached from laptop computer 200. Data is transferred between the two devices using a short range wireless communication, as indicated in FIG. 7.

At step 940 connection wedge 211 uses the wireless communication mode of FIG. 7. Laptop computer 200 switches to an Internet connection that goes wireless from laptop computer 200 to wireless communicator 100, and wirelessly from wireless communicator 100 to Internet 550. Since the low level communication protocol is transparent to the networking stack, the switch from using the physical communication mode of FIG. 7 to using the wireless communication mode of FIG. 8 is a seamless switch. The connection between laptop computer 200 and 550 persists, and the integrity of the data transfer between laptop computer 200 and Internet 550 is maintained before, during and after the switch.

Figure 9:
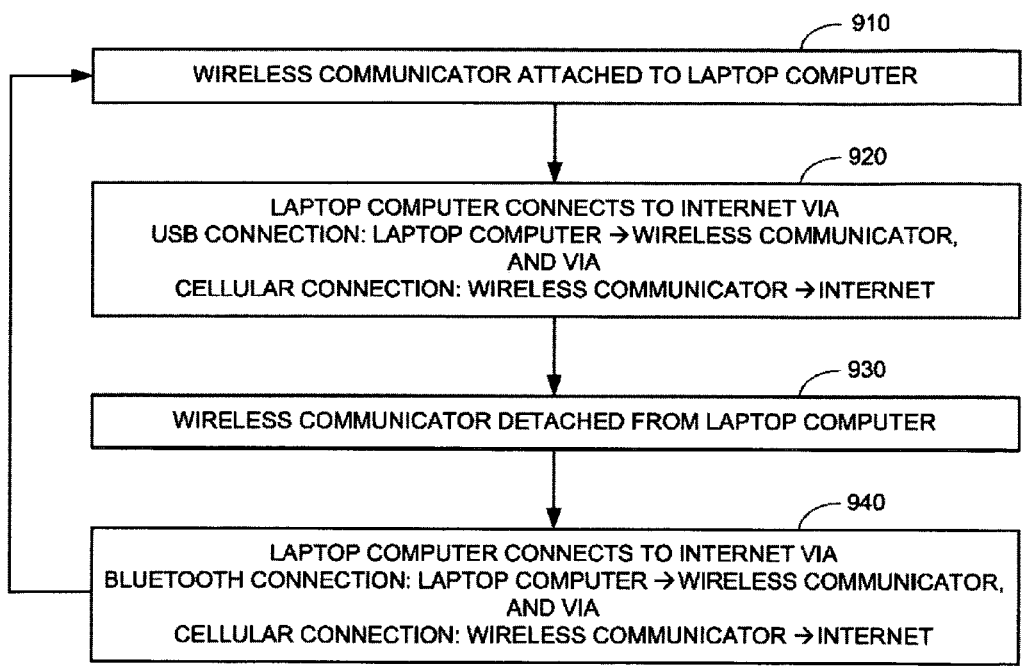
FIG. 9 is a simplified flowchart of switching an Internet connection between the laptop computer and the Internet, according to whether the wireless communicator is physically or wirelessly connected with the laptop computer, in accordance with an embodiment of the present invention.

After step 940, processing in FIG. 9 returns to step 910 when wireless communicator 100 is re-attached to laptop computer 200. As above, since the low level communication protocol is transparent to the networking stack, the switch at step 920 from using the wireless communication mode of FIG. 8 to using the physical communication mode of FIG. 7 is again a seamless switch.

In reading the above description, persons skilled in the art will realize that there are many apparent variations that can be applied to the methods and systems described. Thus it may be appreciated that wireless communicator 100 may also be used in conjunction with audio I/O of laptop computer 200. As such, a phone call may be initiated via wireless communicator 100, using microphone 171 and speaker 175 for audio I/O. If wireless communicator 100 is attached into laptop computer 200 during the call then the audio I/O for the call switches over to microphone 271 and speakers 275. I.e., the audio input of microphone 271 is channeled to wireless communicator 100, and the audio output from wireless communicator 100 is channeled to speakers 275. While wireless communicator 100 is attached to laptop computer 200, wireless communicator 100 provides cellular connectivity, such as GSM connectivity, and laptop computer 200 provides a user interface. In addition to its microphone and speakers, the laptop computer's keyboard 280 and display 285, and optionally a camera, may also be functional for use with the phone call.

When wireless communicator 100 is detached from laptop computer 200, but in communication therewith via short range wireless communication, such as Bluetooth communication, then wireless communicator 100 acts as a Bluetooth earpiece for laptop computer 200. In addition, wireless communicator 100 may be used for dialing.

In general, Bluetooth devices use a headset profile for defining properties of audio gateway devices and headset devices. An "audio gateway" serves as a gateway for audio input and output. A "headset" serves as the audio gateway's remote audio input and output mechanism. In accordance with an embodiment of the present invention, wireless communicator 100 is programmed to act as a Bluetooth earpiece, by using a headset profile that defines laptop computer 200 to be an audio gateway, and defines wireless communicator 100 to be a headset.

If wireless communicator 100 is detached from laptop computer 200 during the call, and not in wireless communication therewith, then the audio I/O for the call switches back to microphone 171 and speaker 175.

It may also be appreciated that although the description above concerns a scenario where wireless communicator 100 provides connectivity for laptop computer 200, the present invention applies to an opposite scenario where laptop computer 200 provides connectivity for wireless communicator 100.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A communication system comprising:
   a wireless communicator comprising:
   a speaker for providing audio output;
   a baseband modem for connecting to the Internet via a cellular network; and
   a connector for physically connecting the wireless communicator to a laptop computer port;
   an audio bridge, (i) for switching audio received using said baseband modem to said speaker, when the wireless communicator is physically disconnected from said port, and (ii) for switching audio received using said baseband modem to the laptop computer, when the wireless communicator is physically connected to said port; and
   a laptop computer comprising:
   at least one speaker for providing audio output;
   a wireless modem for communicating in a wireless mode with said wireless communicator;
   a laptop computer port for physically connecting said wireless communicator to the laptop computer and for communicating in a wired mode with said wireless communicator; and
   a connection wedge,
   wherein said laptop computer connects to the Internet via a link between said laptop computer and said wireless communicator, wherein said connection wedge selectively uses the wired mode or the wireless mode for the link according to whether or not said wireless communicator is physically connected to said laptop computer port, respectively, and wherein the connection between the laptop computer and the Internet is persisted when said connection wedge switches between the wired mode for the link and the wireless mode for the link.

2. The communication system of claim 1 wherein said wireless modem is a Bluetooth modem, and wherein the wireless mode of communication is Bluetooth communication.

3. The communication system of claim 2 wherein said connection wedge transmits Bluetooth information from the laptop computer to the wireless communicator in the wired mode, for use with Bluetooth pairing of the laptop computer and the wireless communicator in the wireless mode.

4. The communication system of claim 3 wherein the Bluetooth information is a PIN code.

5. The communication system of claim 3 wherein the Bluetooth information is timing information.

6. The communication system of claim 1 wherein said wireless communicator connector is a USB connector, and wherein the wired mode of communication is USB communication.

7. The communication system of claim 1 wherein said connection wedge is a unified driver between physical and wireless low level communication drivers of said laptop computer and between a networking stack of said laptop computer.

8. The communication system of claim 7 wherein said laptop computer further comprises a connection tracker communicatively coupled with the physical and wireless low level communication drivers of said laptop computer and with said connection wedge, for tracking whether the wired and wireless modes are active or inactive, and for notifying said connection wedge of such.

9. The communication system of claim 8 wherein said connection wedge uses the wired mode when the wired and wireless modes are both active.

10. The communication system of claim 8 wherein said connection wedge uses the wireless mode when the wired and wireless modes are both active.

11. The communication system of claim 8 wherein said connection wedge instructs the wireless mode to operate in a low power state when the wired mode is active.

12. The communication system of claim 11 wherein said connection wedge instructs the wireless mode to resume operation in a normal power state when the wired mode is subsequently inactive.

13. The communication system of claim 1 wherein said wireless communicator further comprises a connection wedge that selectively uses the wired mode or the wireless mode for the link according to whether or not said wireless communicator is physically connected to said laptop computer, respectively.

* * * * *